(12) United States Patent
Irifune

(10) Patent No.: US 7,374,819 B2
(45) Date of Patent: May 20, 2008

(54) RELEASE FILM

(75) Inventor: Shinji Irifune, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 510 days.

(21) Appl. No.: 11/038,130

(22) Filed: Jan. 21, 2005

(65) Prior Publication Data

US 2005/0164017 A1 Jul. 28, 2005

(30) Foreign Application Priority Data

Jan. 23, 2004 (JP) ............................. 2004-015378
Jan. 14, 2005 (JP) ............................. 2005-007912

(51) Int. Cl.
*C32B 25/20* (2006.01)
(52) U.S. Cl. ................. 428/447; 428/451; 528/31; 528/32
(58) Field of Classification Search ............... 428/447, 428/451; 528/31, 32
See application file for complete search history.

(56) References Cited

U.S. PATENT DOCUMENTS

| 3,922,443 | A | 11/1975 | Brown et al. |
|---|---|---|---|
| 4,057,596 | A | 11/1977 | Takamizawa et al. |
| 4,071,644 | A | 1/1978 | Grenoble et al. |
| 4,618,522 | A * | 10/1986 | Modic ........................ 428/145 |
| 4,772,515 | A | 9/1988 | Hara et al. |
| 6,696,161 | B2 | 2/2004 | Irifune et al. |
| 6,794,444 | B2 * | 9/2004 | Yamamoto et al. ......... 524/588 |

FOREIGN PATENT DOCUMENTS

| EP | 0 150 772 B1 | 8/1985 |
|---|---|---|
| EP | 0 563 704 B1 | 10/1996 |
| EP | 1 277 802 A1 | 1/2003 |
| EP | 1 323 796 A2 | 7/2003 |
| EP | 0 882 576 B1 | 4/2004 |

* cited by examiner

*Primary Examiner*—Kuo-Liang Peng
(74) *Attorney, Agent, or Firm*—Birch, Stewart, Kolasch & Birch, LLP

(57) ABSTRACT

A release film comprising a plastic film substrate 3, a first layer 1 provided on at least one side of the substrate, and a second layer 2 provided on the first layer 1. The second layer 2 functions as a release layer and the first layer 1 as an adhesive layer to fix the second layer 2 on the substrate 3. The release film has a small peel force and can be prepared from solvent-free compositions.

5 Claims, 1 Drawing Sheet

RELEASE FILM

CROSS REFERENCES

This application claims benefits of Japanese Patent Application No. 2004-15378 filed on Jan. 23, 2004, and Japanese Patent Application No. 2005-7912 filed on Jan. 14, 2005, the contents of which are hereby incorporated by reference.

FIELD OF THE INVENTION

The present invention relates to a release film comprising a release layer and an adhesive layer wherein each layer is prepared from each specific silicone composition and the release layer is provided on a substrate film via the adhesive layer. The release film has a good release property and is useful to protect pressure sensitive adhesive of a tape or sheet coated with the pressure sensitive adhesive.

DESCRIPTION OF THE PRIOR ART

A release paper or film is used to protect an adhesive layer of a pressure sensitive adhesive tape or sheet until just before the tape or sheet is put on an object. To prepare a release layer of the release paper or film, a silicone composition is widely used. Conventionally, a silicone composition containing a solvent is widely used because it gives a good release property and is applicable to relatively many kinds of substrates. However, because of the growing concern for safety and hygiene, a need for a composition free of solvents is increasing.

Many solvent-free silicone compositions are known from Japanese Patent Application Laid-open, herein after abbreviated as JPA, No.49-47426, JPA No.50-141591, Japanese Patent No.52-39791, and JPA No.57-77395. A problem of these compositions is that they do not adhere well to a plastic film, though they adhere well to paper.

To solve the problem, silicone compositions are presented in JPA No. 63-27560, JPA No.6-293881 and JPA No.2003-26925, which composition comprises a branched organoviylpolysiloxane.

A release layer obtained by curing the aforesaid silicone compositions are adhered well to a plastic film, but it has a drawback that a force to peel off the pressure sensitive adhesive layer from the release layer, hereinafter referred to as a peel force, is too large.

SUMMARY OF THE INVENTION

A purpose of the present invention is to provide a release film having a release layer which is prepared from a solvent-free composition, is capable of adhering to various kinds of plastic film substrates, and has a small peel force as defined above.

After extensive studies, the inventor has found that the above purpose is attained by providing two silicone layers as shown in FIG. 1, i.e., a first layer 1 and the second layer 2 provided on the first layer 1, and making the second layer 2 functions as a release layer and the first layer 1 as an adhesive layer to fix the second layer 2 on the substrate 3.

Thus, the present invention is a release film comprising a plastic film substrate, a first layer provided on at least one side of the substrate, and a second layer provided on the first layer, characterized in that the first layer is prepared from a first silicone composition comprising the following components (A-1), (B-1), (C-1), and (D-1):

(A-1) 100 parts by weight of an organopolysiloxane (I) represented by the following formula (1),

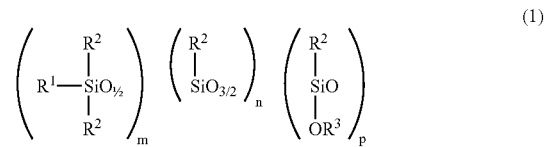

wherein $R^1$ is an alkenyl group, $R^2$ may be the same with or different from each other and is a monovalent hydrocarbon group except an alkenyl group, $R^3$ is a hydrogen atom or an alkyl group, m and n are positive numbers, p is zero or a positive number with $0.6 \leq (n+p)/m \leq 1.5$, and $0 \leq p/(n+p) \leq 0.05$, and m, n and p are selected so that the organopolysiloxane (I) has a viscosity of from 5 to 100 mPa.s at 25 degrees C., (B-1) 10 to 100 parts by weight of an organopolysiloxane(II) represented by the following formula (2),

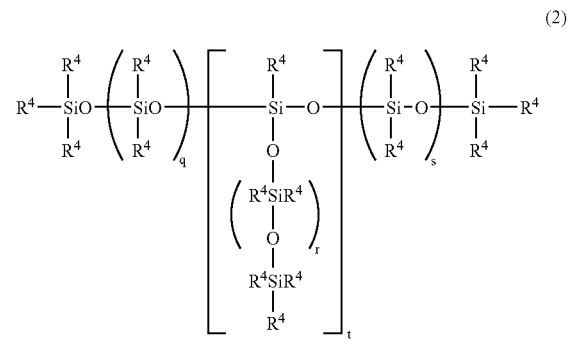

wherein $R^4$ may be the same with or different from each other and is a monovalent hydrocarbon group with at least two $R^4$'s in a molecule being alkenyl groups, t is a number ranging from 0 to 15, each of q, r, and s is zero or a positive number, and t, q, r, and s are selected so that a 30 wt % of the organopolysiloxane (II) solution in toluene has a viscosity of from 100 to 20,000 mPa.s at 25 degrees C., (C-1) 30 to 100 parts by weight of an organohydrogenpolysiloxane having at least two SiH groups in a molecule, and (D-1) a catalytic amount of a compound of a platinum group metal; and the second layer is prepared from a second silicone composition comprising the following components (A-2), (C-2) and (D-2):

(A-2) 100 parts by weight of a polyorganosiloxane having alkenyl groups in an amount of at least two per molecule and from 0.02 to 0.20 mole per 100 g of the polyorganosiloxane, and a viscosity of from 50 to 100,000 mPa.s at 25 degrees C., (C-2) an organohydrogenpolysiloxane having at least two SiH groups per molecule in such an amount that a molar amount of the SiH group in the component (C-2) is 0.5 to 5 times that of the alkenyl group contained in the component (A-2), and (D-2) a catalytic amount of a compound of a platinum group metal.

In the present release film, the release layer, i.e., the second layer, is firmly fixed, by the first adhesive layer, on the plastic film substrate which has a poor adhesion to previous silicone compositions. The release property of the second layer can be easily adjusted to give a release film having a desired peel force.

PREFERRED EMBODIMENT OF THE INVENTION

Figure 1:
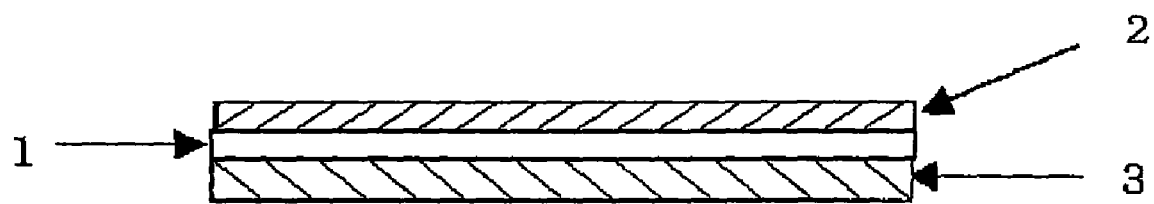
FIG. 1 is a cross sectional view of the present release film.

As the plastic film substrate of the present release film, any known plastic film can be used, for example, polyolefin films such as a biaxially stretched polypropylene film, a polyethylene films an ethylene/propylene copolymer film and a polyester films. A thickness of the film is not limited to a particular range, but typically is in a range of from 5 to 100 μm.

First Silicone Composition

The first silicone composition, hereinafter referred to as silicone composition 1, is applied on the film substrate to form the first layer. The silicone composition 1 as such is known from Japanese Patent Application Laid-open No.2003-26925. This publication teaches to use the composition to prepare a release layer. In contrast, the silicone composition 1 is used to prepare an adhesive layer in the present invention. The silicone composition 1 comprises the components (A-1), (B-1), (C-1), and (D-1). Each component will be explained below.

The component (A-1) consists of one or more organopolysiloxanes (I) which is represented by the formula (1),

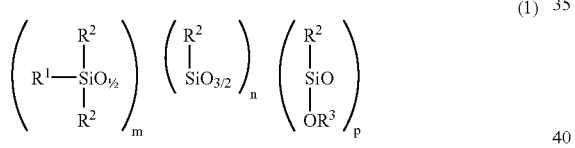

wherein $R^1$ is an alkenyl group, $R^2$ may be the same with or different from each other and is a monovalent hydrocarbon group except an alkenyl group, $R^3$ is a hydrogen atom or an alkyl group, m and n are positive numbers, and p is zero or a positive number with $0.6 \leq (n+p)/m \leq 1.5$, and $0 \leq p/(n+p) \leq 0.05$, and m, n and p are selected so that a viscosity of the organopolysiloxane (I) ranges from 5 to 100 mPa.s at 25 degrees C.

In the formula (1), $R^1$ is an alkenyl group, preferably having 2 to 8 carbon atoms, such as a vinyl, an allyl, a butenyl, a pentenyl and a hexenyl group. Preferably, $R^2$ is a hydrocarbon group having 1 to 8 carbon atoms, for example, an alkyl group such as a methyl, an ethyl, and a propyl group; an aryl group such as a phenyl group; an aralkyl group such as benzyl group; and partly or wholly halogenated groups thereof. Preferred examples of $R^3$ include alkyl groups having 1 to 6 carbon atoms such as a methyl, an ethyl and a propyl group.

In the formula (1), m and n are positive numbers and p is zero or a positive number with $0.6 \leq (n+p)/m \leq 1.5$, preferably $0.8 \leq (n+p)/m \leq 1.2$, and $0 \leq p/(n+p) \leq 0.05$, preferably $0 \leq p/(n+p) \leq 0.03$. If the value, (n+p)/m, is smaller than the aforesaid lower limit, adhesion to the plastic film may be too small. An organopolysiloxane having the value larger than the aforesaid upper limit maybe difficult to prepare because of a higher ratio of $R^2SiO_{3/2}$ in a molecule. An organopolysiloxane having the value, p/(n+p), larger than the aforesaid upper limit may not adhere to the film substrate well.

The organopolysiloxane has a viscosity at 25 degrees C. of from 5 to 100 mPa.s, preferably 10 to 50 mPa.s. If the viscosity is below the aforesaid lower limit, curing speed may be too slow. If it exceeds the aforesaid upper limit, adhesion to the film substrate may be too small. The organopolysiloxane has a vinyl value of from 0.5 to 2.25 mole/100 g, preferably from 0.5 to 1.0 mole/100 g.

The organopolysiloxane(I) may be prepared by (1) subjecting trialkoxymethylsilane, dialkenyltetramethyldisiloxane and hexamethyldisiloxane to hydrolysis and condensation in the presence of an acidic catalyst in an alcoholic solvent followed by neutralizing the acidic catalyst, (2) removing the solvent and alcoholic byproduct, (3) washing the reaction products with water and (4) removing unreacted substances.

The component (B-1) consists of one or more organopolysiloxanes(II) represented by the following formula (2).

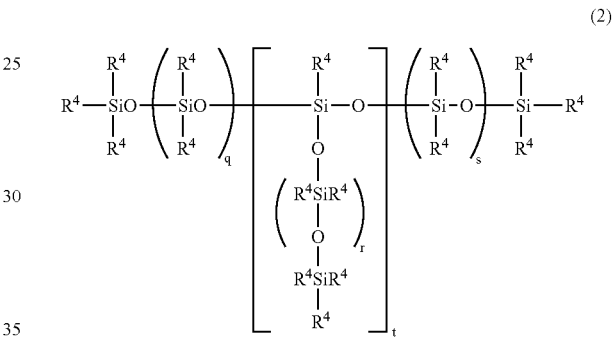

wherein $R^4$ may be the same with or different from each other and is a monovalent hydrocarbon group, with at least two $R^4$'s in a molecule being alkenyl groups, t is a number ranging from 0 to 15, each of q, r, and s is zero or a positive number, and t, q, r, and s are selected so that a 30 wt % of the organopolysiloxane(II) solution in toluene has a viscosity of from 100 to 20,000 mPa.s at 25 degrees C.

In the formula (2), each of t, q, r, and s is zero or a positive number and is selected so that a 30 wt % of the organopolysiloxane(II) solution in toluene has a viscosity at 25 degrees C. of from 100 to 20,000 mPa.s, preferably 200 to 5000 mPa.s with $0 \leq t \leq 15$, preferably $0 \leq t \leq 6$. If the viscosity is below the aforesaid lower limit, it may be difficult to prepare an adhesive layer having a uniform thickness. If the viscosity exceeds the aforesaid upper limit, operation efficiency of coating may be too low.

Preferably, the component (B-1) contains 10 to 50 wt %, based on a total weight of the component (B-1), of a organopolysiloxane(II) having a vinyl value of at least 0.02 mol/100 g, preferably from 0.02 to 0.2 mol/100 g, more preferably from 0.02 to 0.08 mol/100 g. Remaining 90 to 50 wt % of the component (B-1) preferably consists of one or more organopolysiloxanes(II) having a viscosity at 25 degrees C. in a 30 wt % toluene solution of from 200 to 1,000 mPa.s, and a vinyl value of from 0.01 to 0.10 mole/100 g.

The component (B-1) is used in an amount of from 10 to 100 parts by weight, preferably 10 to 50 parts by weight, per 100 parts by weight of the component (A-1). If the amount is below the aforesaid lower limit, a viscosity of the silicone composition 1 may be too low to make a layer of a uniform thickness on the film substrate. If the amount exceeds the aforesaid upper limit, an adhesion of a cured film to the plastic film substrate may be too small.

The component (C-1) consists of one or more organohydrogenpolysiloxanes having at least two, preferably 2 to 1000, SiH groups per molecule. The SiH groups react with alkenyl groups of the organopolysiloxane(I) and (II) to form a cured film. A molecular structure of the organohydrogenpolysiloxane may be linear, branched or cyclic.

The organohydrogenpolysiloxane may be represented by the following formula (3).

$$R^5{}_aH_bSiO_{(4-a-b)/2} \quad (3)$$

wherein $R^5$ is a substituted or unsubstituted monovalent hydrocarbon group except an alkenyl group, preferably, having 1 to 8 carbon atoms. Examples of $R^5$ include alkyl groups such as a methyl, an ethyl, and a propyl group; an aryl group such as a phenyl group; and halogen substituted alkyl groups such as 3,3,3-trifluoropropyl group. Preferably, at least 80% of $R^8$ in a molecule is methyl group. The numbers, a and b, are positive with, $0.7 \leq a \leq 2.1$, $0.001 \leq b \leq 1.0$ and $0.8 \leq a+b \leq 2.6$, preferably, $0.8 \leq a \leq 2.0$, $0.01 \leq b \leq 1$ and $1 \leq a+b \leq 2.4$.

A molecular structure of the organohydrogenpolysiloxane may be linear, branched or cyclic. The organohydrogenpolysiloxane may have a viscosity at 25 degrees C. of from a few mPa.s to several tens of thousand mPa.s, preferably 1000 mPa.s or smaller, more preferably 400 mPa.s or smaller.

Examples of the organohydrogenpolysiloxane include 1,3,5,7-tetramethylcyclotetrasiloxane, a methylhydrogenpolysiloxane with both ends capped with trimethylsiloxy groups, a dimethylsiloxane/methyhydrogensiloxane copolymer with both ends capped with trimethylsiloxy groups, dimethylpolysiloxane with both ends capped with dimethylhydrogensiloxy groups, a dimethylsiloxane/methyhydrogensiloxane copolymer with both ends capped with dimethylhydrogensiloxy groups, a methyhydrogensiloxane/diphenylsiloxane copolymer with both ends capped with trimethylsiloxy groups, a methyhydrogensiloxane/diphenylsiloxane/dimethylsiloxane copolymer with both ends capped with trimethylsiloxy groups, a copolymer consisting of $(CH_3)_2HSiO_{1/2}$ units and $SiO_{4/2}$ units, a copolymer consisting of $(CH_3)_2HSiO_{1/2}$ units, $SiO_{4/2}$ units and $(C_6H_5)SiO_{3/2}$ units, and a mixture thereof.

An amount of the component (C-1) to be used may be adjusted according to an amount of alkenyl groups contained in the organopolysiloxane (I) and (II). Generally, the amount ranges from 30 to 100 parts by weight per 100 parts by weight of the component (A-1). If the amount is below the aforesaid lower limit, the cured adhesive layer may not be hard enough. If the amount exceeds the aforesaid upper limit, desired adhesion to the substrate may not be attained.

The platinum metal compound of the component (D-1) is used to promote the addition reaction among the components (A-1), (B-1) and the component (C-1) to make a cured film. Examples of the platinum metal compound include platinum black, hydrogen chloroplatinic acid, a complex or hydrogen chloroplatinic acid with olefin, alcoholic solution of hydrogen chloroplatinic acid, rhodium, a complex of rhodium with olefin and a mixture thereof. The platinum metal compound is used in an amount effective as a catalyst which can be adjusted according to reactivities of the aforesaid components or a desired curing speed. Typically, the amount ranges from 1 to 1000 ppm, as platinum metal, based on a total amount of the components (A-1), (B-1) and (C-1) to economically obtain a cured film having good adhesion.

The silicone composition 1 may preferably be prepared by thoroughly mixing the components (A-1), (B-1), (C-1) and an optional component as necessary and then adding the component (D-1).

Examples of the optional component include catalytic activity inhibitors (E) such as various kinds of organic nitrogen compounds, organic phosphorous compounds, acetylenic compounds, and oxime compounds; and an agent to control adhesion strength such as silicone resins, silica, and organopolysiloxanes which does not have SiH groups or alkenyl groups. The optional component is added in such an amount that it does not adversely affect the present invention.

As component (E); any known catalytic activity inhibitors may be used, for example, acetylenic compounds such as 3-methyl-1-butyne-3-ol, 3,5-dimethyl-1-hexyne-3-ol, 3-methyl-1-pentyne-3-ol, ethynylcyclohexanol, and phenylbutynol; and reaction products of these acetylenic compounds with alkoxysilane, alkoxysiloxane, hydrogensilane or hydrogensiloxane; vinyl siloxanes such as cyclic tetramethylvinylsiloxane; organic nitrogen compounds such as bezotriazole, organic phosphorous compounds and oxime compounds.

The component (E) may be used in such an amount that a desired shelf life of the silicone composition 1 is obtained. Generally, the amount ranges from 0.01 to 10 parts by weight, preferably from 0.05 to 5 parts by weight per 100 parts by weight in total of the components (A-1) and (B-1).

The silicone composition 1 can be free from solvent. However, a little amount of an organic solvent (F) may be used to improve application operability or adjust application amount. Examples of the organic solvent (F) include organic solvents such as toluene, xylene, ethyl acetate, acetone, methylethyl ketone, and hexane.

The silicone composition 1 thus prepared is applied to the aforesaid plastic film and cured by heating. An amount to be applied is not limited to a particular range but, typically, ranges from about 0.01 to about 2.0 g/m². The curing may be performed preferably at a temperature of from 50 to 200 degrees C. for 1 second to 5 minutes.

Second Silicone Composition

In the present release film, a second layer is prepared from a second silicon composition, hereinafter referred to as silicone composition 2. The second layer is applied on the first layer to form a release layer. The silicone composition but it does not adhere well to a plastic film substrates In the present invention, the first layer bonds the second layer to the film substrate.

The silicone composition 2 comprises the components (A-2), (C-2), and (D-2). Each component will be explained below.

The component (A-2) consists of one or more organopolysiloxanes having an alkenyl group in an amount of at least two per molecule and of from 0.02 to 0.2 mole per 100 g of the polyorganosiloxan, and a viscosity at 25 degrees C. of 50 to 100,000 mPa.

The organopolysiloxane may be represented by the formula (4), $$R^6{}_cR^7{}_dSiO_{(4-c-d)/2} \quad (4)$$

wherein $R^6$ is a substituted or unsubstituted monovalent hydrocarbon group except an alkenyl group and, if there are a plurality of $R^6$'s, they may be the same with or different from each other, $R^7$ is an alkenyl group of the formula, $-(CH_2)_e-CH=CH_2$, wherein e is an integer of from 0 to 6, and c and d are numbers with $0 \leq c \leq 3$, $0 \leq d \leq 3$, and $1 \leq c+d \leq 3$, preferably $0.5 \leq c \leq 2.5$, $0.0002 \leq d \leq 1$, and $1.5 \leq c+d \leq 2.5$.

Preferably, $R^7$ is represented by the formula, $-(CH_2)_e-CH=CH_2$, wherein e is an integer of from 0 to 6, of which examples include a vinyl, an allyl, a butenyl, a pentenyl, a hexenyl and a heptenyl group are. Among these, a vinyl group is preferred from the industrial viewpoint.

Examples of the monovalent hydrocarbon group, $R^6$, include alkyl groups such as a methyl, an ethyl, a propyl, a butyl, a pentyl, a hexyl, an octyl, a decyl, a dodecyl, a tetradecyl, hexadecyl, and an octadecyl group; cycloalkyl groups such as a cyclohexyl group; aryl groups such as a phenyl, a naphthyl a cyclohexyl group; aryl groups such as a phenyl, a naphthyl and a tolyl group; and partly or wholly halogenated, cyano or hydroxyl substituted groups thereof such as a 3,3,3-trifluoropropyl, a cyanopropyl, a phenol and a hindered phenol group. Preferably, $R^6$ is an alkyl group having 1 to 8 carbon atoms or a phenyl group. More preferably, $R^6$ is a methyl group in an amount of at least 50 mole % based on a total content of the substituents, $R^6+R^7$, in a molecule of the organopolysiloxane.

The organopolysiloxane may be linear or branched and preferably has the alkenyl group at a terminal. The organopolysiloxane has a viscosity at 25 degrees C. of from 50 to 100,000 mPa.s, pereferably from 50 to 5,000 mPa.s.

As the organohydrogenpolysiloxane of the component (C-2), any known organohydrogenpolysiloxane having at least two SiH groups in a molecule can be used. In principle, the same type of organohydrogenpolysiloxane as that of the component (C-1) may be used. An amount of the component (C-2) to be used can be adjusted according to a desired release property but, typically, is such that a molar amount of H atom bonded to Si atom is 0.5 to 5 times that of the alkenyl group in the component (A-2), which amount usually corresponds to 0.1 to 30 parts by weight, more typically 20 or smaller parts by weight per 100 parts by weight of the component (A-2).

The platinum metal compound in the component (D-2) may be of the same type as the component (D-1). An amount of the component (D-2) to be used may be the same as that in the component (D-1), which amount usually ranges from 1 to 1000 ppm as platinum metal based on a total weight of the components (A-2) and (C-2).

The silicone composition 2 may comprise optional components such as the catalytic activity inhibitor (E) and the agent to control releasing property in such an amount that they do not adversely affect the present invention.

The silicone composition 2 is applied on the cured first silicone layer and then heat cured. An amount to be applied is not limited to a particular range, but usually ranges from about 0.03 to about 2.0 g/m². The curing is preferably performed at a temperature of from 50 to 200 degrees C. for 1 second to 5 minutes.

Each layer can be applied by any known means such as a bar coater, roll coater, reverse coater, gravure coater, air knife coater and, for thin film coating, a high precision offset coater and multistep roll coater.

EXAMPLES

The present invention will be explained in detail with reference to the examples, but not limited to them.

A. Preparation of a Silicone Mixture for a Silicone Composition 1

A silicone mixture, hereinafter referred to as silicone mixture 1, used to prepare a silicone composition 1 according to the invention was prepared by thoroughly mixing 50 parts by weight of an orgnopolysiloxane represented by the following formula (5) having a viscosity of 25 mPa.s at 25 degrees C. and a vinyl value of 0.57 mole/100 g,

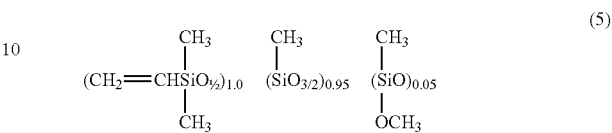

13 parts by weight of a orgnopolysiloxane represented by the following formula and having a viscosity in a 30 wt % toluene solution of 5000 mPa.s at 25 degrees C. and a vinyl value of 0.07 mole/100 g,

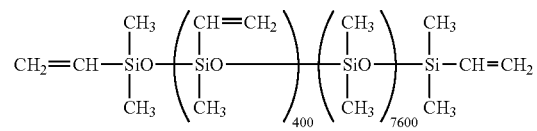

36 parts by weight of an organohydrogenpolysiloxane represented by the following formula (6),

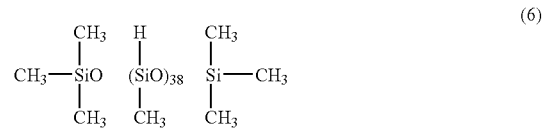

and 1.0 part by weight of ethynylcyclohexanol.

B. Preparation of a Silicone Mixture for a Silicone Composition 2

A silicone mixture, hereinafter referred to as silicone mixture 2, used to prepare a silicone composition 2 according to the invention was prepared by thoroughly mixing 97.6 parts by weight of an orgnopolysiloxane having a vinyl group at each of the both ends, a viscosity of 400 mPa.s at 25 degrees C., and a vinyl value of 0.02 mole/100 g, 2.1 parts by weight of the organohydrogenpolysiloxane represented by the aforesaid formula (6), and 0.3 part by weight of ethynylcyclohexanol.

C. Examples 1-3

To 100 parts by weight of the silicone mixture 1, 1 part by weight of a complex of chloroplatinic acid with vinylsiloxane, corresponding to 50 ppm as platinum, was added and well mixed to prepare a silicone composition 1.

Next, to 100 parts by weight of the silicone mixture 2, 2 parts by weight of the complex of chloroplatinic acid with vinylsiloxane, corresponding to 100 ppm as platinum, was added and well mixed to prepare a silicone composition 2.

On each film substrate shown in Table 1, the silicone composition 1 was applied in the amount specified in Table 1 and then heated to 120 degrees C. for 10 seconds in a hot-air dryer to form a silicone layer 1. Subsequently, a silicone layer 2 was formed by applying the silicone composition 2 on the cured silicone layer 1 in the amount shown in Table 1 and then heating to 120 degrees C. for 30 seconds in the hot-air dryer to prepare a release film.

D. Comparative Examples 1&2 and Referential Examples 1&2

Comparative Example 1

A release film was prepared by applying the silicone composition 1 in the amount shown in Table 1 and then heating to 120 degrees C. in the hot-air dryer for 30 seconds.

Comparative Example 2

A release film was prepared by applying the silicone composition 2 in the amount shown in Table 1 and then heating to 120 degrees C. in the hot-air dryer for 30 seconds.

Referential Example 1

A mixture of 70 parts by weight of the silicone mixture 1 and 30 parts by weight of the silicone mixture 2 was prepared, to which 2 parts by weight of a complex of chloroplatinic acid with vinylsiloxane, corresponding to 100 ppm as platinum, was added and well mixed. The mixture thus obtained was applied on the plastic film substrate shown in Table 1 and then heated to 120 degrees C. for 30 seconds.

Referential Example 2

The procedures in the referential example 1 were repeated except a mixture of 30 parts by weight of the silicone mixture 1 and 70 parts by weight of the silicone mixture 2 was used.

E. Evaluation Methods

The Release films thus obtained were evaluated according to the following methods.

Adhesion to a Film Substrate (i) Initial Adhesion

After a release film was kept at 25 degrees C. for 1 hour, several places in a surface of the release layer thereof was rubbed with a finger back and forth several times and then visually observed for any cloudy place caused by the rubbing or any rubbed-off place. The adhesion of the release layer to the substrate was rated according to the criteria below:

A: no cloudy or rubbed-off place,
B: no rubbed-off place, but a few cloudy places,
C: a few rubbed-off places,
D: rubbed off at a first rubbing.

(ii) Adhesion after Aging

After the release film was kept at 25 degrees C. for additional 20 days, different places than those rubbed in the above test were rubbed, observed and rated in the same manner as above.

Force Required to Peel

On a release layer of each of the release films, an acrylic pressure sensitive adhesive, BPS-5127, ex Toyo Ink Manufacturing Co. Ltd., or a rubber pressure sensitive adhesive., BPS-2411, ex Toyo Ink Manufacturing Co. Ltd., was applied as shown in Table 1 and heated to 100 degrees C. for 3 minutes. On the adhesive layer thus obtained, an overlay plastic film of the same material and thickness as those of the release film substrate was attached, from which a test piece in about 20 cm length×50 mm width was cut out which was conditioned at room temperature for 1 day. Using a tensile tester, a force (N/50 mm) required to peel off the overlay film from the release film at an angle of 180 degrees and a pull rate of 0.3 m/min was measured.

Adhesive Maintenance Ratio

To a release layer of each release film, a polyester tape having a pressure sensitive adhesive layer, Nitto 31B, ex Nitto Denko Co., Ltd., was attached on which a load of 1976 Pa was applied. The combined set of the release film and the polyester tape with the load on was kept at 70 degrees C. for 20 hours. The polyester tape was peeled off from the release film and then attached again to a stainless steel plate. Using a tensile tester, a force required to peel off the tape from the steel plate at an angle of 180 degrees and a pull rate of 0.3 n/min was measured in the same manner as in the measurement of the peel force described above. As a blank sample, a tetrafluoroethylene plate was used instead of the release film. An adhesive maintenance ratio was calculated from the following formula, An adhesive maintenance ratio(%)=$(S/B) \times 100$ wherein "S" is a measured force for the release film and "B" is that for the tetrafluoroethylene plate.

TABLE 1

| | Substrate, thickness (μm) | Applied amount of the silicone composition 1 (g/m$^2$) | Applied amount of the silicone composition 2 (g/m$^2$) | Adhesion Initial | Adhesion After aging | Peel force BPS-5127 | Peel force BPS-2411 | Adhesive maintenance ratio(%) |
|---|---|---|---|---|---|---|---|---|
| Example 1 | polypropylene film, 40 | 0.18 | 0.72 | A | A | 0.15 | 0.60 | 108 |
| Example 2 | polyester film, 38 | 0.18 | 0.80 | A | B-A*[2] | 0.18 | 0.57 | 113 |
| Example 3 | polypropylene film, 40 | 0.47 | 0.72 | A | A | 0.14 | 0.68 | 108 |
| Comparative Example 1 | polypropylene film, 40 | 0.70 | — | A | A | 10.54 | 11.76 | 105 |
| Comparative Example 2 | polypropylene film, 40 | — | 0.74 | D | D | 0.15 | 0.73 | 106 |
| Referential Example 1 | polypropylene film, 40 | 0.8*[1] | | A | B-A*[2] | 0.74 | 6.52 | 105 |
| Referential Example 2 | polypropylene film, 40 | 0.78*[1] | | B-A*[2] | D | 0.30 | 3.92 | 108 |

*[1]Applied amount of the mixture of the silicone compositions 1 and 2.
*[2]Among the several places tested, some were rated as A and the others as B.

As shown in Table 1, adhesion in the release film of Examples 1-3 is significantly larger than that of Comparative Example 2, indicating that the present release layer is firmly fixed on the plastic substrate. The adhesion hardly decreased by aging. Further, the release films of Examples 1-3 have significantly smaller peel force than that of Comparative Example 1. These properties of the present release film cannot be obtained by merely combining the two silicone compositions as shown in Referential Examples 1 and 2.

The adhesive maintenance ratio indicates how much of the pressure sensitive adhesive is maintained in the adhesive tape after it is attached to a release film and then peeled off from the release film. As seen in Table 1, all of the release films of the present invention showed 100% maintenance ratio within an error range and, thus, were proved to be useful for protecting pressure sensitive adhesive products.

What is claimed is:

1. A release film comprising a plastic film substrate, a first layer provided on at least one side of the substrate, and a second layer provided on the first layer, characterized in that the first layer is prepared from a first silicone composition comprising the following components (A-1), (B-1), (C-1), and (D-1):

(A-1) 100 parts by weight of an organopolysiloxane(I) represented by the following formula (1),

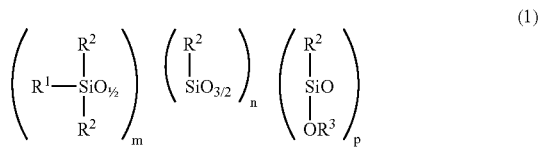

wherein $R^1$ is an alkenyl group, $R^2$ may be the same with or different from each other and is a monovalent hydrocarbon group except an alkenyl group, $R^3$ is a hydrogen atom or an alkyl group, m and n are positive numbers, p is zero or a positive number with $0.6 \leq (n+p)/m \leq 1.5$, and $0 \leq p/(n+p) \leq 0.05$, and m, n and p are selected so that the organopolysiloxane (I) has a viscosity of from 5 to 100 mPa.s at 25 degrees C., (B-1) 10 to 100 parts by weight of an organopolysiloxane (II) represented by the following formula (2),

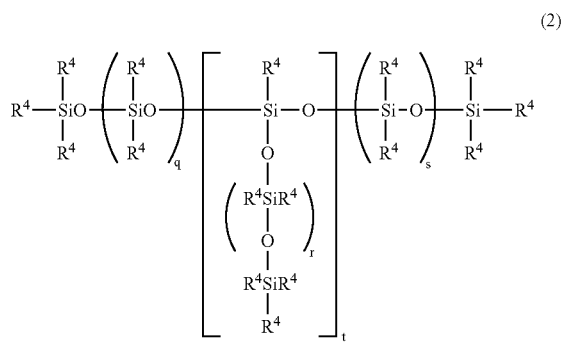

wherein $R^4$ may be the same with or different from each other and is a monovalent hydrocarbon group with at least two $R^4$'s in a molecule being alkenyl groups, t is a number ranging from 0 to 15, each of q, r, and s is zero or a positive number, and t, q, r, and s are selected so that a 30 wt % of the organopolysiloxane(II) solution in toluene has a viscosity of from 100 to 20,000 mpa.s at 25 degrees C., (C-1) 30 to 100 parts by weight of an organohydrogenpolysiloxane having at least two SiH groups in a molecule, and (D-1) a catalytic amount of a compound of a platinum group metal; and the second layer is prepared from a second silicone composition comprising the following components (A-2), (C-2) and (D-2):

(A-2) 100 parts by weight of a polyorganosiloxane having alkenyl groups in an amount of at least two per molecule and from 0.02 to 0.20 mole per 10 g of the polyorganosiloxane, and a viscosity of from 50 to 100,000 mPa.s at 25 degrees C., (C-2) an organohydrogenpolysiloxane having at least two SiH groups per molecule in such an amount that a molar amount of the SiH group in the component (C-2) is 0.5 to 5 times that of the alkenyl group contained in the component (A-2), and (D-2) a catalytic amount of a compound of a platinum group metal.

2. The release film according to claim 1, wherein the component (B-1) comprises 10 to 50 wt %, based on a total weight of the component (B-1), of the organopolysiloxane (II) having a viscosity in a 30 wt % solution in toluene of from 1000 to 10,000 mPa.s at 25 degrees C. and a vinyl value of at least 0.02 mole/100 g.

3. The release film according to claim 1, wherein the organohydrogenpolysiloxane (C-1) is represented by the formula

wherein $R^5$ is a monovalent hydrocarbon group except an alkenyl group, at least 80% of $R^5$ in a molecule is a methyl group, and a and b are numbers with $0.7 \leq a \leq 2.1$, $0.001 \leq b \leq 1$ and $0.8 \leq a+b \leq 2.6$.

4. The release film according to claim 1, wherein the polyorganosiloxane (A-2) is represented by the following formula (4),

wherein $R^6$ is a substituted or unsubstituted monovalent hydrocarbon group except an alkenyl group, $R^7$ is an alkenyl group represented by the formula, $-(CH_2)_e-CH=CH_2$, wherein e is an integer of from 0 to 6, and c and d are numbers with $0 \leq c \leq 3$, $0 < d \leq 3$, and $1 \leq c+d \leq 3$.

5. The release film according to anyone of claims 1 to 4, wherein the first silicone composition further comprises a catalytic activity inhibiter (E) in an amount of from 0.01 to 10 parts by weight per a total 100 parts by weight of the organopolysiloxane (I) and the organopolysiloxane (II).

* * * * *